US010153089B2

(12) United States Patent
Yang et al.

(10) Patent No.: US 10,153,089 B2
(45) Date of Patent: Dec. 11, 2018

(54) THIN-FILM CAPACITOR FOR ELECTRIC VEHICLE

(71) Applicant: BYD COMPANY LIMITED, Shenzhen, Guangdong (CN)

(72) Inventors: Wei Yang, Guangdong (CN); Siyuan Liu, Guangdong (CN); Lusheng Wu, Guangdong (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 15/603,090

(22) Filed: May 23, 2017

(65) Prior Publication Data

US 2017/0256357 A1 Sep. 7, 2017

Related U.S. Application Data

(63) Continuation of application No. PCT/CN2015/091857, filed on Oct. 13, 2015.

(30) Foreign Application Priority Data

Nov. 28, 2014 (CN) .................... 2014 2 0735741 U

(51) Int. Cl.
*H01G 2/04* (2006.01)
*H01G 4/32* (2006.01)
(Continued)

(52) U.S. Cl.
CPC .............. *H01G 4/228* (2013.01); *H01G 2/04* (2013.01); *H01G 2/06* (2013.01); *H01G 4/224* (2013.01);
(Continued)

(58) Field of Classification Search
CPC .. H01G 4/30; H01G 4/33; H01G 2/02; H01G 2/04
See application file for complete search history.

(56) References Cited

U.S. PATENT DOCUMENTS 7,092,238 B2    8/2006 Saito et al.
2008/0273289 A1* 11/2008 Saito .................. H01G 2/04
                                                    361/306.3
2009/0059467 A1   3/2009 Grimm et al.

FOREIGN PATENT DOCUMENTS

CN        1714415 A     12/2005
CN      202384178 U      8/2012
(Continued)

OTHER PUBLICATIONS

International Search Report and Written Opinion for Application No. PCT/CN2015/091857, dated Jan. 13, 2016, 8 pages.

*Primary Examiner* — Eric Thomas
(74) *Attorney, Agent, or Firm* — Sheppard Mullin Richter & Hampton LLP

(57) ABSTRACT

The present disclosure discloses a thin-film capacitor for an electric vehicle, including: a casing, a plurality of capacitor cores, an anode busbar, a cathode busbar, a first electrode terminal, a second electrode terminal, a first connection sheet, a second connection sheet, a first battery connection sheet, a second battery connection sheet, a first battery connection terminal and a second battery connection terminal, in which the first battery connection sheet is connected to the anode busbar and adjacent to an end of the anode busbar, the second battery connection sheet is connected to the cathode busbar and adjacent to the first battery connection sheet, an axis of one of the plurality of the capacitor cores is arranged to be perpendicular to the anode busbar and the cathode busbar and two ends of the one capacitor core are connected to the first battery connection sheet and the second battery connection sheet respectively.

20 Claims, 3 Drawing Sheets

(51) Int. Cl.
*H01G 4/228* (2006.01)
*H01G 4/38* (2006.01)
*H01G 2/06* (2006.01)
*H01G 4/248* (2006.01)
*H01G 4/224* (2006.01)
*H01G 4/33* (2006.01)
*H01R 11/28* (2006.01)
*H01R 25/16* (2006.01)
*B60L 11/18* (2006.01)

(52) U.S. Cl.
CPC ............... *H01G 4/248* (2013.01); *H01G 4/33* (2013.01); *H01G 4/38* (2013.01); *H01R 11/288* (2013.01); *H01R 25/161* (2013.01); *B60L 11/18* (2013.01); *Y02T 10/7022* (2013.01)

(56) References Cited

FOREIGN PATENT DOCUMENTS

| | | |
|---|---|---|
| CN | 204332695 U | 5/2015 |
| JP | 2007-242860 A | 9/2007 |
| WO | 2014/027720 A1 | 2/2014 |

\* cited by examiner

THIN-FILM CAPACITOR FOR ELECTRIC VEHICLE

CROSS-REFERENCE TO RELATED APPLICATIONS

This application is a continuation application of International Application No. PCT/CN2015/091857, filed on Oct. 13, 2015, which is based on and claims priority to and benefits of Chinese Patent Application No. 201420735741.X, filed with the State Intellectual Property Office (SIPO) of the People's Republic of China on Nov. 28, 2014. The entire contents of the above-identified application are incorporated herein by reference.

FIELD

The present disclosure relates to a capacitor, and more particularly relates to a thin-film capacitor for an electric vehicle.

BACKGROUND

A thin-film capacitor such as a metalized thin-film capacitor has characteristics like a low loss, a high voltage resistance, a temperature characteristic and a good frequency characteristic.

Chinese patent CN1714415B discloses a metalized film capacitor. Two buses of the metallized film capacitor are connected to a capacitor core and oppositely disposed at both sides of the capacitor core. Chinese patent CN202384178U discloses a capacitor structure having internal laminated busbars. A first and a second busbar of the capacitor structure have L shapes and the bottoms of the first and second busbars are superposed together. Side walls of the two busbars are opposite to each other and provided with welding portions, and the welding portions are welded with the capacitor core. In the capacitor described above, due to the design of the side walls of the busbars, the size and the number of the capacitor core are severely limited. Otherwise, in the related art, a core body located at the end of the capacitor is vertically positioned, small connection sheets are extended from upper and lower connection sheets towards the place in which the core body is positioned between the upper and lower connection sheets and are used for being connected to two ends of the core body. The leading-out of the small connection sheet causes a reduction of the polar plate area, and the leading-out position of the connection sheet is close to the leading-out end at the same time, and thus the leading-out position of the connection sheet is greatly affected by the heating of the leading-out end of the capacitor core.

SUMMARY

The present disclosure aims to solve at least one of the above problems.

Accordingly, a thin-film capacitor for an electric vehicle is provided by the present disclosure and has a good heat dissipation effect and a high quality.

The thin-film capacitor for the electric vehicle according to embodiments of the present disclosure includes: a casing, a plurality of capacitor cores, an anode busbar, a cathode busbar, a first electrode terminal connected to the anode busbar, a second electrode terminal connected to the cathode busbar, a first connection sheet, a second connection sheet, a first battery connection sheet, a second battery connection sheet, a first battery connection terminal and a second battery connection terminal, in which the plurality of capacitor cores, the anode busbar, the cathode busbar, the first connection sheet, the second connection sheet, the first battery connection sheet, the second battery connection sheet are disposed within the casing and sealed by potting insulators; the anode busbar and the cathode busbar are superposed together and an insulation sheet is provided between the anode busbar and the cathode busbar; the first connection sheet and the second connection sheet are opposed to each other and the capacitor core is disposed between the first connection sheet and the second connection sheet, the first connection sheet is connected to the anode busbar and provided with a first connection terminal connected to the capacitor core, the second connection sheet is connected to the cathode busbar and provided with a second connection terminal connected to the capacitor core; the first battery connection sheet is connected to the anode busbar and adjacent to an end of the anode busbar, the second battery connection sheet is connected to the cathode busbar and adjacent to the first battery connection sheet, the first battery connection terminal is connected to the first battery connection sheet, the second battery connection terminal is connected to the second battery connection sheet, an axis of one of the plurality of the capacitor cores is perpendicular to the anode busbar and the cathode busbar and two ends of the one of the plurality of the capacitor cores are connected to the first battery connection sheet and the second battery connection sheet respectively, axes of rest ones of the plurality of the capacitor cores are parallel to the anode busbar and the cathode busbar.

With the thin-film capacitor for the electric vehicle according to embodiments of the present disclosure, by providing a structure in which the axis of one of the plurality of the capacitor cores is perpendicular to the anode busbar and the cathode busbar, an overcurrent and a heat dissipation area of a first anode terminal and a first cathode terminal at corresponding ends of the anode busbar and the cathode busbar are effectively increased and a temperature rise of the thin-film capacitor is reduced, which ensures an overall quality of the thin-film capacitor.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

Figure 1:
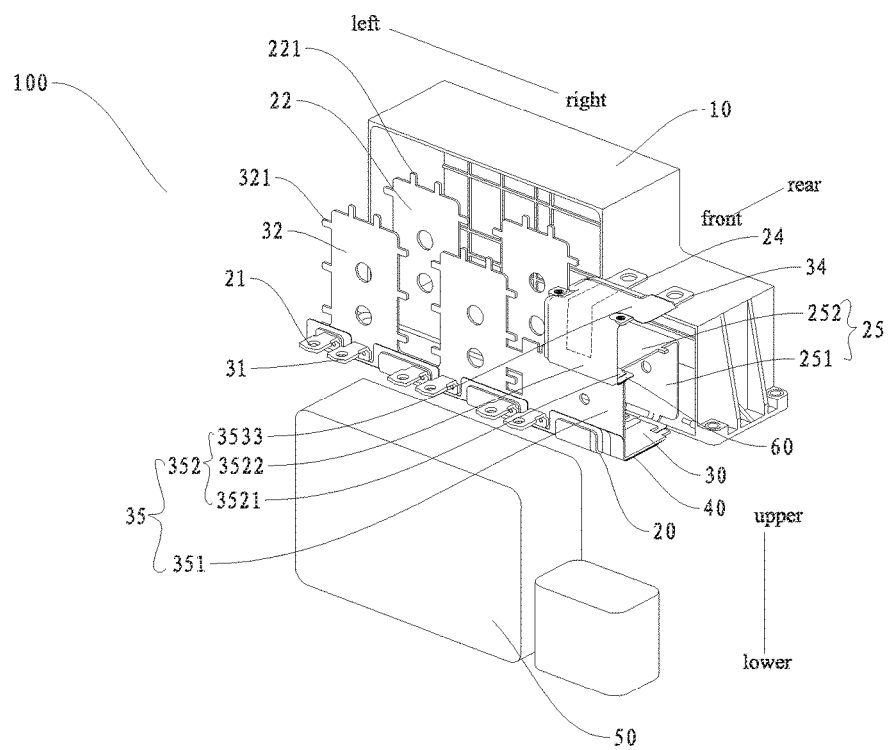
FIG. 1 is a schematic view of a thin-film capacitor for an electric vehicle according to an embodiment of the present disclosure.

REFERENCE NUMERALS thin-film capacitor 100;
casing 10;
anode busbar 20; first electrode terminal 21; first connection sheet 22; first connection terminal 221; first extending portion 23; first battery connection terminal 24; first battery connection sheet 25; first plate limb 251; second plate limb 252;
cathode busbar 30; second electrode terminal 31; second connection sheet 32; second connection terminal 321; notch 322; second battery connection terminal 34; second battery connection sheet 35; first sheet portion 351; second sheet portion 352; first sheet limb 3521; second sheet limb 3522; third sheet limb 3533;
insulation sheet 40; short limb 41; long limb 42; capacitor core 50;
insulation layer 60.

DETAILED DESCRIPTION

Reference will be made in detail to embodiments of the present disclosure, where the same or similar elements and the elements having the same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "length," "width," "thickness," "upper," "lower," "front," "rear," "left," "right," "vertical," "horizontal," "top," "bottom," "inner," and "outer" should be construed to refer to the orientation as then described or as shown in the drawings under discussion. These relative terms are for convenience of description and do not require that the present disclosure be constructed or operated in a particular orientation, thus shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means at least two, e.g. two, three and so on, unless specified otherwise.

In the description of the present disclosure, it should be understood that, unless specified or limited otherwise, the terms "mounted," "supported," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A thin-film capacitor 100 for an electric vehicle according to embodiments of the present disclosure will be described with reference to drawings.

As shown in FIGS. 1 to 5, the thin-film capacitor 100 for an electric vehicle according to embodiments of the present disclosure includes: a casing 10, a plurality of capacitor cores 50, an anode busbar 20, a cathode busbar 30, a first electrode terminal 21 connected to the anode busbar 20, a second electrode terminal 31 connected to the cathode busbar 30, a first connection sheet 22, a second connection sheet 32, a first battery connection terminal 24 and a second battery connection terminal 34.

Specifically, the plurality of capacitor cores 50, the anode busbar 20, the cathode busbar 30, the first connection sheet 22, the second connection sheet 32, the first battery connection terminal 24, and the second battery connection terminal 34 are disposed within the casing 10 and sealed by potting insulators, and the anode busbar 20 and the cathode busbar 30 are superposed together and an insulation sheet 40 is provided between the anode busbar 20 and the cathode busbar 30.

The first connection sheet 22 and the second connection sheet 32 are opposed to each other and the capacitor core 50 is disposed between the first connection sheet 22 and the second connection sheet 32, the first connection sheet 22 is connected to the anode busbar 20 and provided with a first connection terminal 221 connected to the capacitor core 50, and the second connection sheet 32 is connected to the cathode busbar 30 and provided with a second connection terminal 321 connected to the capacitor core 50.

The first battery connection sheet 25 is connected to the anode busbar 20 and adjacent to an end of the anode busbar 20, and the second battery connection sheet 35 is connected to the cathode busbar 30 and adjacent to the first battery connection sheet 25. The first battery connection terminal 24 is connected to the first battery connection sheet 25, and the second battery connection terminal 34 is connected to the second battery connection sheet 35, in which an axis of one of the plurality of capacitor cores 50 is arranged to be perpendicular to the anode busbar 20 and the cathode busbar 30, and two ends of the one of the plurality of capacitor cores 50 are connected to the first battery connection sheet 25 and the second battery connection sheet 35 respectively.

In other words, as shown in FIG. 1, the anode busbar 20, the insulation sheet 40 and the cathode busbar 30 are superposed together and the insulation sheet 40 is provided between the anode busbar 20 and the cathode busbar 30 to make the anode busbar 20 and the cathode busbar 30 insulated from each other. The first connection sheet 22 may be perpendicularly connected to an edge of the anode busbar 20, and the second connection sheet 32 may be perpendicularly connected to an edge of the cathode busbar 30. The capacitor core 50 is disposed between the first connection sheet 22 and the second connection sheet 32. That is, the anode busbar 20, the cathode busbar 30 and the insulation sheet 40 are all disposed at a side surface of the capacitor core 50.

The anode busbar 20 is provided with the first electrode terminal 21 and the cathode busbar 30 is provided with the second electrode terminal 31. The first electrode terminal 21 and the second electrode terminal 31 are connected to a connection terminal of an Insulated Gate Bipolar Transistor (IGBT) respectively. The first connection sheet 22 is provided with the first connection terminal 221, and the first connection terminal 221 is welded with a first end of the capacitor core 50. The second connection sheet 32 is provided with the second connection terminal 321, and the second connection terminal 321 is welded with a second end of the capacitor core 50.

The anode busbar 20 and the cathode busbar 30 are respectively configured as horizontal plates extended along a left and right direction. The first battery connection sheet 25 is disposed at a right end of the anode busbar 20 and connected to the anode busbar 20. The first battery connection terminal 24 is connected to the first battery connection sheet 25. The second battery connection sheet 35 is disposed at a right end of the cathode busbar 30 and connected to the cathode busbar 30. The second battery connection terminal 34 is connected to the second battery connection sheet 35.

A plurality of capacitor cores 50 are provided, in which, each of the capacitor cores 50 located between the first connection sheet 22 and the second connection sheet 32 extends in a front and rear direction, and front and rear ends of each of the capacitor cores 50 are connected to the second connection sheet 32 and the first connection sheet 22 respectively; the capacitor core 50 located between the first battery connection sheet 25 and the second battery connection sheet 35 extends in an upper and lower direction, and upper and lower ends of the capacitor core 50 are connected to the first battery connection sheet 25 and the second battery connection sheet 35 respectively.

Therefore, with the thin-film capacitor 100 for the electric vehicle according to embodiments of the present disclosure, the anode busbar 20 and the cathode busbar 30 are substantially disposed within the casing 10, the first connection sheet 22 connected to the anode busbar 20 and the second connection sheet 32 connected to the cathode busbar 30 are positioned at the two ends of the capacitor core 50 respectively. The first connection sheet 22 and the second connection sheet 32 may be directly connected to the capacitor core 50 in a welding manner, which is convenient for the welding automation, effectively improves the product quality and the manufacturing efficiency and reduces the cost. The cathode busbar 30, the anode busbar 20 and the insulation sheet 40 are all located at the side surface of the capacitor core 50, which may effectively reduce inductances between the first electrode terminal 21, the second electrode terminal 31 and the connection terminal of IGBT.

In addition, with the thin-film capacitor 100 for the electric vehicle according to embodiments of the present disclosure, by providing the capacitor core 50 close to the right ends of the anode busbar 20 and the cathode busbar 30 and having the axis of the capacitor core 50 perpendicular to the anode busbar 20 and the cathode busbar 30, an overcurrent and a heat dissipation area of a first anode terminal and a first cathode terminal at right ends of the anode busbar 20 and the cathode busbar 30 are effectively increased and a temperature rise of the thin-film capacitor 100 is reduced, thus ensuring the overall quality of the thin-film capacitor 100.

According to an embodiment of the present disclosure, the first connection sheet 22, the first connection terminal 221 and the anode busbar 20 are integrally formed; the second connection sheet 32, the second connection terminal 321 and the cathode busbar 30 are integrally formed.

In other words, the first connection sheet 22 is a portion of the anode busbar 20 and extended outwards from an edge of the anode busbar 20 perpendicular to the anode busbar 20, and the first connection terminal 221 is a portion of the first connection sheet 22 and extended outwards from the first connection sheet 22. The second connection sheet 32 is a portion of the cathode busbar 30 and extended outwards of an edge of the cathode busbar 30 perpendicular to the cathode busbar 30, and the second connection terminal 321 is a portion of the second connection sheet 32 and extended outwards from the second connection sheet 32. Thus, the thin-film capacitor 100 for the electric vehicle having this structure ensures the stability of the whole structure and is easier to be formed and assembled, which further reduces the manufacturing cost.

Figure 2:
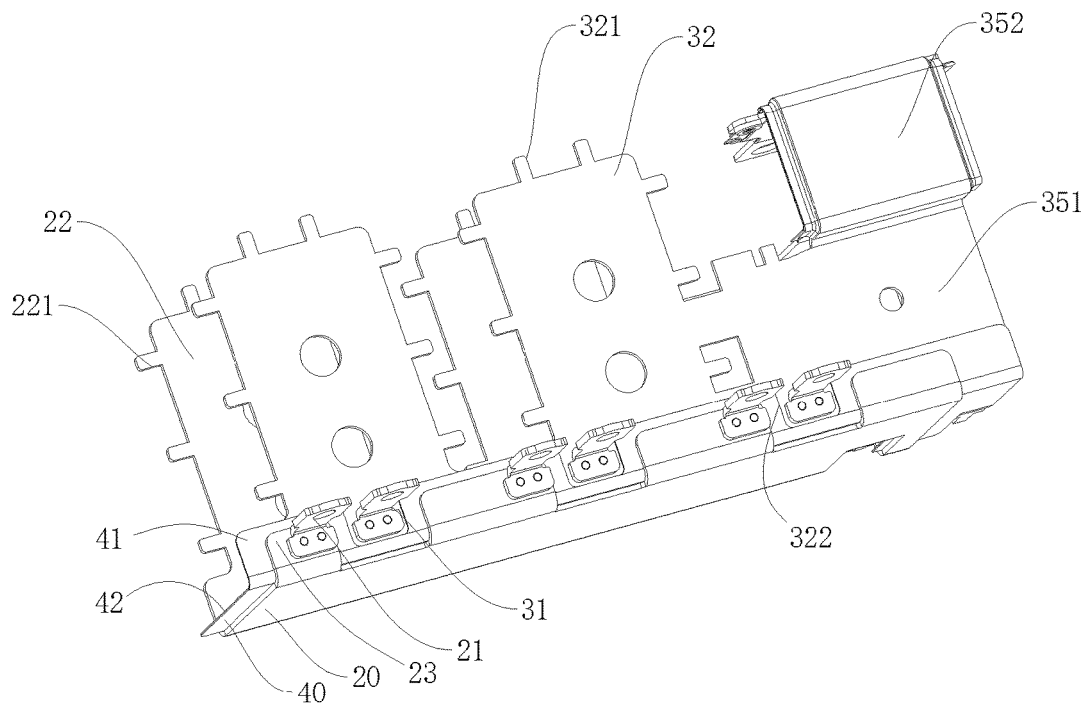
FIG. 2 is a schematic view of an anode busbar and a cathode busbar according to an embodiment of the present disclosure.
Figure 3:
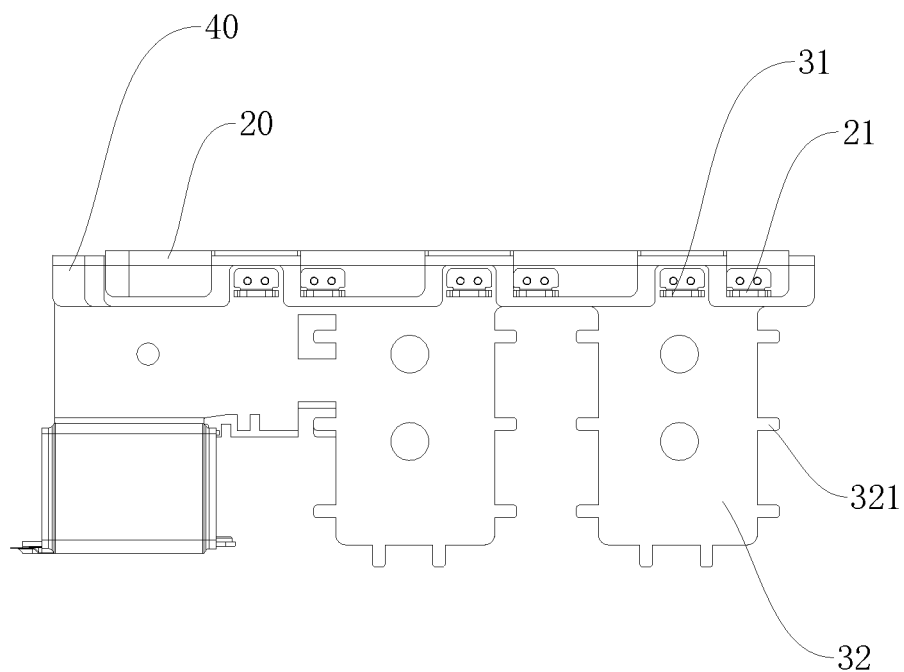
FIG. 3 is a top view of an anode busbar and a cathode busbar according to an embodiment of the present disclosure as shown in FIG. 2.
Figure 4:
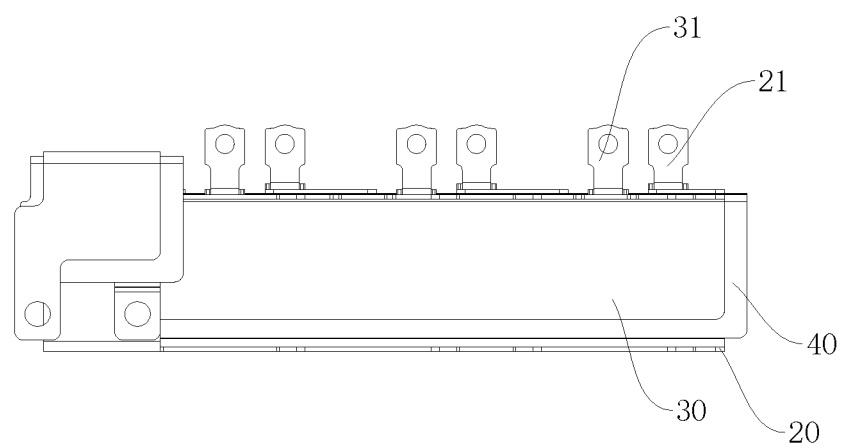
FIG. 4 is a front view of an anode busbar and a cathode busbar according to an embodiment of the present disclosure as shown in FIG. 2.
Figure 5:
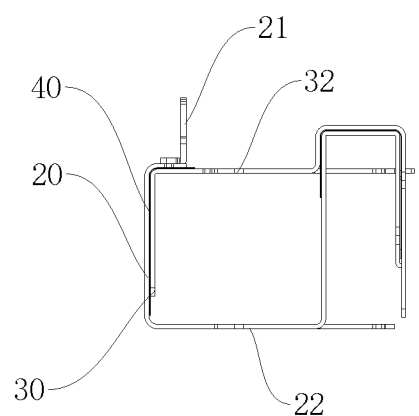
FIG. 5 is a side view of an anode busbar and a cathode busbar according to an embodiment of the present disclosure as shown in FIG. 2.

As shown in FIGS. 2 and 3, according to an embodiment of the present disclosure, a plurality of the first connection terminals 221 are provided, disposed at a peripheral edge of the first connection sheet 22 and spaced apart from each other. A plurality of the second connection terminals 321 are provided, disposed at a peripheral edge of the second connection sheet 32 and spaced apart from each other.

In other words, the plurality of the first connection terminals 221 are disposed on the peripheral edge of the first connection sheet 22 and the plurality of the second connection terminals 321 are disposed on the peripheral edge of the second connection sheet 32. The plurality of the first connection terminals 221 are spaced apart from each other on the peripheral edge of the first connection sheet 22 and the plurality of the second connection terminals 321 are spaced apart from each other on the peripheral edge of the second connection sheet 32. Numbers of the first connection terminals 221 and the second connection terminals 321 may be corresponding to a number of the capacitor cores 50. Arrangement positions of the first connection terminals 221 on the first connection sheet 22 may be the same with those of the second connection terminals 321 on the second connection sheet 32, so that both ends of each capacitor core 50 can be connected to the corresponding first connection terminal 221 and second connection terminal 321.

In some embodiments of the present disclosure, the first electrode terminal 21 is connected to the anode busbar 20 by a rivet or a screw, and the second electrode terminal 31 is connected to the cathode busbar 30 by a rivet or a screw. That is, the first electrode terminal 21 and the second electrode terminal 31 may be connected to the anode busbar 20 and the cathode busbar 30 by the rivet or the screw. Thus, this connection manner is simple and feasible, and convenient to operate.

When the plurality of the capacitor cores 50 are provided, the anode busbar 20 and the cathode busbar 30 may be connected to IGBT via a plurality of the first electrode terminals 21 and a plurality of the second electrode terminals 31 respectively. Alternatively, as shown in FIG. 2, according to an embodiment of the present disclosure, the plurality of the first electrode terminals 21 and the plurality of the second electrode terminals 31 are provided to form a plurality of pairs of electrode terminals, and the first electrode terminal 21 is adjacent to the second electrode terminal 31 in each pair.

Specifically, the anode busbar 20 is provided with the plurality of the first electrode terminals 21 in a length direction thereof and the cathode busbar 30 is provided with the plurality of the second electrode terminals 31 in a length direction thereof, in which each two adjacent electrode terminals, i.e., the first electrode terminal 21 and the second electrode terminal 31 arranged adjacent to the first electrode terminal 21, form a pair, and three pairs of the first electrode terminals 21 and the second electrode terminals 31 may be provided by the whole thin-film capacitor 100 for the electric vehicle in the length directions of the anode busbar 20 and cathode busbar 30. Thus, the anode busbar 20 and cathode busbar 30 are connected to IGBT via the plurality of the first electrode terminals 21 and the plurality of the second electrode terminals 31 respectively, which further reduces the inductances of the first electrode terminals 21 and the second electrode terminal 31.

In other embodiments of the present disclosure, the first electrode terminal 21 is connected to the anode busbar 20, and the second electrode terminal 31 is connected to the cathode busbar 30 via the second connection sheet 32.

In other words, the first connection sheet 22 and the anode busbar 20 may be integrally formed, the first connection sheet 22 is formed by bending a portion of the anode busbar 20, and the first electrode terminal 21 is connected to the anode busbar 20. Correspondingly, the second connection sheet 32 and the cathode busbar 30 may be integrally formed, and the second connection sheet 32 is formed by bending a portion of the cathode busbar 30. The second electrode terminal 31 is connected to the second connection sheet 32 so as to perform a connection with the cathode busbar 30. Therefore, the first electrode terminal 21 and the second electrode terminal 31 having this structure further simplify the connections with the anode busbar 20 and the cathode busbar 30, thus further simplifying the assembling procedure so as to improve the production efficiency.

The structure of each component of the thin-film capacitor 100 for the electric vehicle according to embodiments of the present disclosure will be described in detail below.

As shown in FIG. 2, according to an embodiment of the present disclosure, the insulation sheet 40 has an L shape and includes a short limb 41 and a long limb 42, the anode busbar 20 is disposed on an outer surface of the long limb 42 of the insulation sheet 40, and the cathode busbar 30 is disposed on an inner surface of the long limb 42 of the insulation sheet 40. It should be understood that, the outer surface of the insulation sheet 40 is referred to a wall surface facing away from a side surface of the capacitor core 50 and the inner surface of the insulation sheet 40 is referred to a wall surface facing towards a side surface of the capacitor core 50.

In some specific embodiments of the present disclosure, the anode busbar 20 includes a first extending portion 23 extended onto an outer surface of the short limb 41 of the insulation sheet 40, and the first electrode terminal 21 is connected to the first extending portion 23. The second connection sheet 32 includes a second extending portion extended onto the outer surface of the short limb 41 of the insulation sheet 40 and adjacent to the first extending portion 23, and the second electrode terminal 31 is connected to the second extending portion. Furthermore, the first connection sheet 22 is extended from an edge of a free end of the anode busbar 20 away from the short limb 41, and the second connection sheet 32 is extended from an edge of a free end of the cathode busbar 30 adjacent to the short limb 41.

Preferably, according to an embodiment of the present disclosure, the first extending portion 23 and the anode busbar 20 are integrally formed, and the second extending portion and the second connection sheet 32 are integrally formed. In other words, the first extending portion 23 is formed by extending a portion of the anode busbar 20, and the second extending portion is formed by extending a portion of the second connection sheet 32.

In other words, the first connection sheet 22 is disposed at a rear edge of the anode busbar 20 and perpendicular to the anode busbar 20, and the first extending portion 23 is disposed at a front edge of the anode busbar 20 and perpendicular to the anode busbar 20. The first extending portion 23 is attached on the outer surface of the short limb 41 of the insulation sheet 40. The first electrode terminal 21 is connected to the first extending portion 23.

The second connection sheet 32 is disposed at a front edge of the cathode busbar 30 and perpendicular to the cathode busbar 30. The second connection sheet 32 is disposed above the short limb 41 of the insulation sheet 40 and at least a portion of the second connection sheet 32 is extended upwards beyond an upper surface of the insulation sheet 40 so as to form a second extending portion. The second electrode terminal 31 is connected to the second extending portion. Thus, the insulation sheet 40 has a reasonable structure, so that it is convenient for the first connection terminal 221 and the second connection terminal 321 to connect to the anode busbar 20 and the cathode busbar 30 respectively.

As shown in FIG. 1, in other specific embodiments of the present disclosure, the anode busbar 20 includes the first extending portion 23 extended onto the outer surface of the short limb 41 of the insulation sheet 40, and the first electrode terminal 21 is connected to the first extending portion 23. The short limb 41 of the insulation sheet 40 has a notch 322 configured to expose a portion of the second connection sheet 32 therefrom and adjacent to the first extending portion 23, and the second electrode terminal 31 is connected to the portion of the second connection sheet 32 exposed from the notch 322.

In other words, the first connection sheet 22 is disposed at the rear edge of the anode busbar 20 and perpendicular to the anode busbar 20, and the first extending portion 23 is disposed at the front edge of the anode busbar 20 and perpendicular to the anode busbar 20. The first extending portion 23 is attached on the outer surface of the short limb 41 of the insulation sheet 40. The first electrode terminal 21 is connected to the first extending portion 23.

The second connection sheet 32 is disposed at the front edge of the cathode busbar 30 and perpendicular to the cathode busbar 30. The second connection sheet 32 is disposed above the short limb 41 of the insulation sheet 40. The short limb 41 of the insulation sheet 40 has the notch 322 configured to expose the portion of the second connection sheet 32 therefrom and adjacent to the first extending portion 23, so that the second electrode terminal 31 can be arranged adjacent to the corresponding first electrode terminal 21. Thus, by providing the notch 322 in the short limb 41 of the insulation sheet 40, it is more convenient for a connection between the second electrode terminal 31 and the cathode busbar 30, which further simplifies the assembling process of the thin-film capacitor 100 for the electric vehicle and improves the assembly efficiency.

A shape of each component of the thin-film capacitor 100 for the electric vehicle may be reasonably adjusted based on an environment in which it is required to be used. Alternatively, each of the anode busbar 20, the cathode busbar 30, the first connection sheet 22 and the second connection sheet 32 has a rectangle shape. Furthermore, a plurality of the first connection sheets 22 are provided and spaced apart from each other in the length direction of the anode busbar 20, and a plurality of the second connection sheets 32 are provided and spaced apart from each other in the length direction of the cathode busbar 30.

Structures of the first battery connection sheet 25 and the second battery connection sheet 35 according to embodiments of the present disclosure will be described in detail below.

The first battery connection sheet 25 includes a first plate limb 251 and a second plate limb 252 connected to the first plate limb 251 with a predetermined angle, the first plate limb 251 is extended from an edge of the anode busbar 20, and the second plate limb 252 is opposed to the anode busbar 20. The second battery connection sheet 35 includes a first sheet portion 351 and a second sheet portion 352, and the first sheet portion 351 is extended from an edge of the cathode busbar 30 and opposed the first plate limb 251. The second sheet portion 352 includes a first sheet limb 3521 and a second sheet limb 3522 connected to the first sheet limb 3521 with a predetermined angle, a free edge of the first sheet portion 351 is connected to an outer surface of the first sheet limb 3521, and a portion of the second plate limb 252 is opposed to a portion of the first sheet limb 3521 and an insulation layer 60 is provided between the portions. The first battery connection terminal 24 is connected to the second plate limb 252, and the second battery connection terminal 34 is connected to the second sheet portion 352.

Furthermore, the second battery connection sheet 35 further includes a third sheet limb 3533 connected to a free edge of the second sheet limb 3522 and opposed to the second plate limb 252. The first battery connection terminal 24 has an L shape, and has a first limb opposed to the second sheet limb 3522 and a second limb opposed to the third sheet limb 3533, and an insulation layer 60 is provided between the first battery connection terminal 24 and the second and third sheet limbs. In some embodiments, the plurality of capacitor cores 50 are provided, and one of the plurality of capacitor cores 50 is connected with the second plate limb 252 of the first battery connection sheet 25 and the cathode busbar 30 respectively.

In other words, as shown in FIG. 1, the first battery connection sheet 25 is disposed at the right end of the anode busbar 20. The first battery connection sheet 25 includes the first plate limb 251 and the second plate limb 252. The first plate limb 251 is perpendicular to the rear edge of the anode busbar 20 and extended upwards, and the second plate limb 252 is perpendicular to an upper edge of the first plate limb 251 and extended forwards, i.e., the second plate limb 252 is parallel with the cathode busbar 30. The first battery connection terminal 24 is configured to have an L shape extending upwards from a front edge of the second plate limb 252 and then extending backwards. The upper end of the capacitor core 50, which is disposed at the right end of the anode busbar 20, is connected to the second plate limb 252 and the lower end of the capacitor core 50 is connected to the cathode busbar 30.

The second battery connection sheet 35 is disposed at the right end of the cathode busbar 30. The second battery connection sheet 35 includes the first sheet portion 351 and the second sheet portion 352, the first sheet portion 351 is perpendicular to the front edge of the cathode busbar 30 and extended upwards, and the second sheet portion 352 includes the first sheet limb 3521, the second sheet limb 3522 and the third sheet limb 3533. The first sheet limb 3521 is perpendicular to the first sheet portion 351, and the front edge of the second plate limb 252 is disposed on an upper end of the first sheet limb 3521 and spaced apart from the upper end of the first sheet limb 3521 by the insulation layer 60. The second sheet limb 3522 is perpendicular to a front edge of the first sheet limb 3521 and extended upwards. The third sheet limb 3533 is perpendicularly connected to an upper edge of the second sheet limb 3522, i.e., the third sheet limb 3533 is parallel with the second plate limb 252, and the second battery connection terminal 34 is connected to a rear edge of the third sheet limb 3533.

Therefore, the axis of the capacitor core 50 at a right end of the thin-film capacitor 100 is arranged to be perpendicular to the anode busbar 20 and the cathode busbar 30, so that the overcurrent and heat dissipation area of the first anode terminal and the first cathode terminal at the right ends of the anode busbar 20 and the cathode busbar 30 are effectively increased and the temperature rise of the thin-film capacitor 100 is reduced. Meanwhile, the first battery connection terminal 24 and the second battery connection terminal 34 are far away from the first anode terminal and the first cathode terminal, and thus less affected by the heating of the leading-out end of the capacitor core 50 so as to less affect an ambient temperature of the capacitor core 50, thus ensuring the overall quality of the thin-film capacitor 100.

In some specific embodiments of the present disclosure, the first battery connection sheet 25 and the anode busbar 20 are integrally formed, and the second battery connection sheet 35 and the cathode busbar 30 are integrally formed. Thus, the thin-film capacitor 100 having this structure ensures the structure stability and simplifies the structure. Moreover, the thin-film capacitor 100 having this structure is convenient to form and reduces the cost.

Other structures and operations of the thin-film capacitor 100 for the electric vehicle according to embodiments of the present disclosure are known to those skilled in the art, and thus will not be described in detail here.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A thin-film capacitor for an electric vehicle, comprising: a casing, a plurality of capacitor cores, an anode busbar, a cathode busbar, a first electrode terminal connected to the anode busbar, a second electrode terminal connected to the cathode busbar, a first connection sheet, a second connection sheet, a first battery connection sheet, a second battery connection sheet, a first battery connection terminal and a second battery connection terminal, wherein the plurality of capacitor cores, the anode busbar, the cathode busbar, the first connection sheet, the second connection sheet, the first battery connection sheet, the second battery connection sheet are disposed within the casing and sealed by potting insulators;

the anode busbar and the cathode busbar are superposed together and an insulation sheet is provided between the anode busbar and the cathode busbar;

the first connection sheet and the second connection sheet are opposed to each other and the capacitor core is disposed between the first connection sheet and the second connection sheet, the first connection sheet is connected to the anode busbar and provided with a first connection terminal connected to the capacitor core, the second connection sheet is connected to the cathode busbar and provided with a second connection terminal connected to the capacitor core;

the first battery connection sheet is connected to the anode busbar and adjacent to an end of the anode busbar, the second battery connection sheet is connected to the cathode busbar and adjacent to the first battery connection sheet, the first battery connection terminal is connected to the first battery connection sheet, the second battery connection terminal is connected to the second battery connection sheet, an axis of one of the plurality of the capacitor cores is perpendicular to the anode busbar and the cathode busbar and two ends of the one of the plurality of the capacitor cores are connected to the first battery connection sheet and the second battery connection sheet respectively, axes of rest ones of the plurality of the capacitor cores are parallel to the anode busbar and the cathode busbar; wherein the first electrode terminal is connected to the anode busbar by a rivet or a screw.

2. The thin-film capacitor according to claim 1, wherein the first connection sheet, the first connection terminal and the anode busbar are integrally formed; the second connection sheet, the second connection terminal and the cathode busbar are integrally formed.

3. The thin-film capacitor according to claim 2, wherein a plurality of the first connection terminals are disposed at a peripheral edge of the first connection sheet and spaced apart from each other, and a plurality of the second connection terminals are disposed at a peripheral edge of the second connection sheet and spaced apart from each other.

4. The thin-film capacitor according to claim 1, wherein the second electrode terminal is connected to the cathode busbar by a rivet or a screw.

5. The thin-film capacitor according to claim 1, wherein a plurality of the first electrode terminals and a plurality of the second electrode terminals are provided to form a plurality of pairs of electrode terminals, and the first electrode terminal is adjacent to the second electrode terminal in each pair.

6. The thin-film capacitor according to claim 1, wherein the first electrode terminal is connected to the anode busbar, and the second electrode terminal is connected to the cathode busbar via the second connection sheet.

7. The thin-film capacitor according to claim 1, wherein the insulation sheet has an L shape and comprises a short limb and a long limb, the anode busbar is disposed on an outer surface of the long limb of the insulation sheet, the cathode busbar is disposed on an inner surface of the long limb of the insulation sheet.

8. The thin-film capacitor according to claim 7, wherein the anode busbar comprises a first extending portion extended onto an outer surface of the short limb of the insulation sheet, the first electrode terminal is connected to the first extending portion, the second connection sheet comprises a second extending portion extended onto the outer surface of the short limb of the insulation sheet and adjacent to the first extending portion, and the second electrode terminal is connected to the second extending portion.

9. The thin-film capacitor according to claim 8, wherein the first extending portion and the anode busbar are integrally formed, and the second extending portion and the second connection sheet are integrally formed.

10. The thin-film capacitor according to claim 7, wherein the anode busbar comprises a first extending portion extended onto an outer surface of a short limb of the insulation sheet, the first electrode terminal is connected to the first extending portion, the short limb of the insulation sheet defines a notch configured to expose a portion of the second connection sheet therefrom and adjacent to the first extending portion, the second electrode terminal is connected to the portion of the second connection sheet exposed from the notch.

11. The thin-film capacitor according to claim 7, wherein the first connection sheet is extended from an edge of a free end of the anode busbar away from the short limb, the second connection sheet is extended from an edge of a free end of the cathode busbar adjacent to the short limb.

12. The thin-film capacitor according to claim 11, wherein the first connection sheet is parallel to the second connection sheet.

13. The thin-film capacitor according to claim 1, wherein each of the anode busbar, the cathode busbar, the first connection sheet and the second connection sheet has a rectangle shape.

14. The thin-film capacitor according to claim 1, wherein a plurality of the first connection sheets are provided and spaced apart from each other in a length direction of the anode busbar, a plurality of the second connection sheets are provided and spaced apart from each other in a length direction of the cathode busbar.

15. The thin-film capacitor according to claim 1, wherein the first battery connection sheet comprises a first plate limb and a second plate limb connected to the first plate limb with a predetermined angle, the first plate limb is extended from an edge of the anode busbar, the second plate limb is opposed to the anode busbar, the second battery connection sheet comprises a first sheet portion and a second sheet portion, the first sheet portion is extended from an edge of the cathode bus and opposed the first plate limb, the second sheet portion comprises a first sheet limb and a second sheet limb connected to the first sheet limb with a predetermined angle, a free edge of the first sheet portion is connected to an outer surface of the first sheet limb, a portion of the second plate limb is opposed to a portion of the first sheet limb and an insulation layer is provided between the portions, the first battery connection terminal is connected to the second plate limb, and the second battery connection terminal is connected to the second sheet portion.

16. The thin-film capacitor according to claim 15, wherein the second battery connection sheet further comprises a third sheet limb connected to a free edge of the second sheet limb and opposed to the second plate limb, the first battery connection terminal has an L shape, and has a first limb opposed to the second sheet limb and a second limb opposed to the third sheet limb, an insulation layer is provided between the first battery connection terminal and the second and third sheet limbs.

17. The thin-film capacitor according to claim 15, wherein one of the plurality of the capacitor cores is directly connected to the second plate limb of the first battery connection sheet and the cathode busbar.

18. The thin-film capacitor according to claim 1, wherein the first battery connection sheet and the anode busbar are integrally formed, and the second battery connection sheet and the cathode busbar are integrally formed.

19. A thin-film capacitor for an electric vehicle, comprising: a plurality of capacitor cores, an anode busbar, a cathode busbar, a first connection sheet, a second connection sheet, a first battery connection sheet, a second battery connection sheet, a first battery connection terminal and a second battery connection terminal, wherein the first battery connection sheet is connected to the anode busbar and adjacent to an end of the anode busbar, the second battery connection sheet is connected to the cathode busbar and adjacent to the first battery connection sheet, the first battery connection terminal is connected to the first battery connection sheet, the second battery connection terminal is connected to the second battery connection sheet, an axis of one of the plurality of the capacitor cores is perpendicular to the anode busbar and the cathode busbar and two ends of the one of the plurality of the capacitor cores are connected to the first battery connection sheet and the second battery connection sheet respectively, axes of rest ones of the plurality of the capacitor cores are parallel to the anode busbar and the cathode busbar;

wherein the first electrode terminal is connected to the anode busbar by a rivet or a screw.

20. The thin-film capacitor according to claim 19, further comprising:

a casing, a first electrode terminal connected to the anode busbar, and a second electrode terminal connected to the cathode busbar, wherein the plurality of capacitor cores, the anode busbar, the cathode busbar, the first connection sheet, the second connection sheet, the first battery connection sheet, the second battery connection sheet are disposed within the casing and sealed by potting insulators;

the anode busbar and the cathode busbar are superposed together and an insulation sheet is provided between the anode busbar and the cathode busbar; and the first connection sheet and the second connection sheet are opposed to each other and the capacitor core is disposed between the first connection sheet and the second connection sheet, the first connection sheet is connected to the anode busbar and provided with a first connection terminal connected to the capacitor core, the second connection sheet is connected to the cathode busbar and provided with a second connection terminal connected to the capacitor core.

* * * * *